United States Patent Office 2,993,504
Patented July 25, 1961

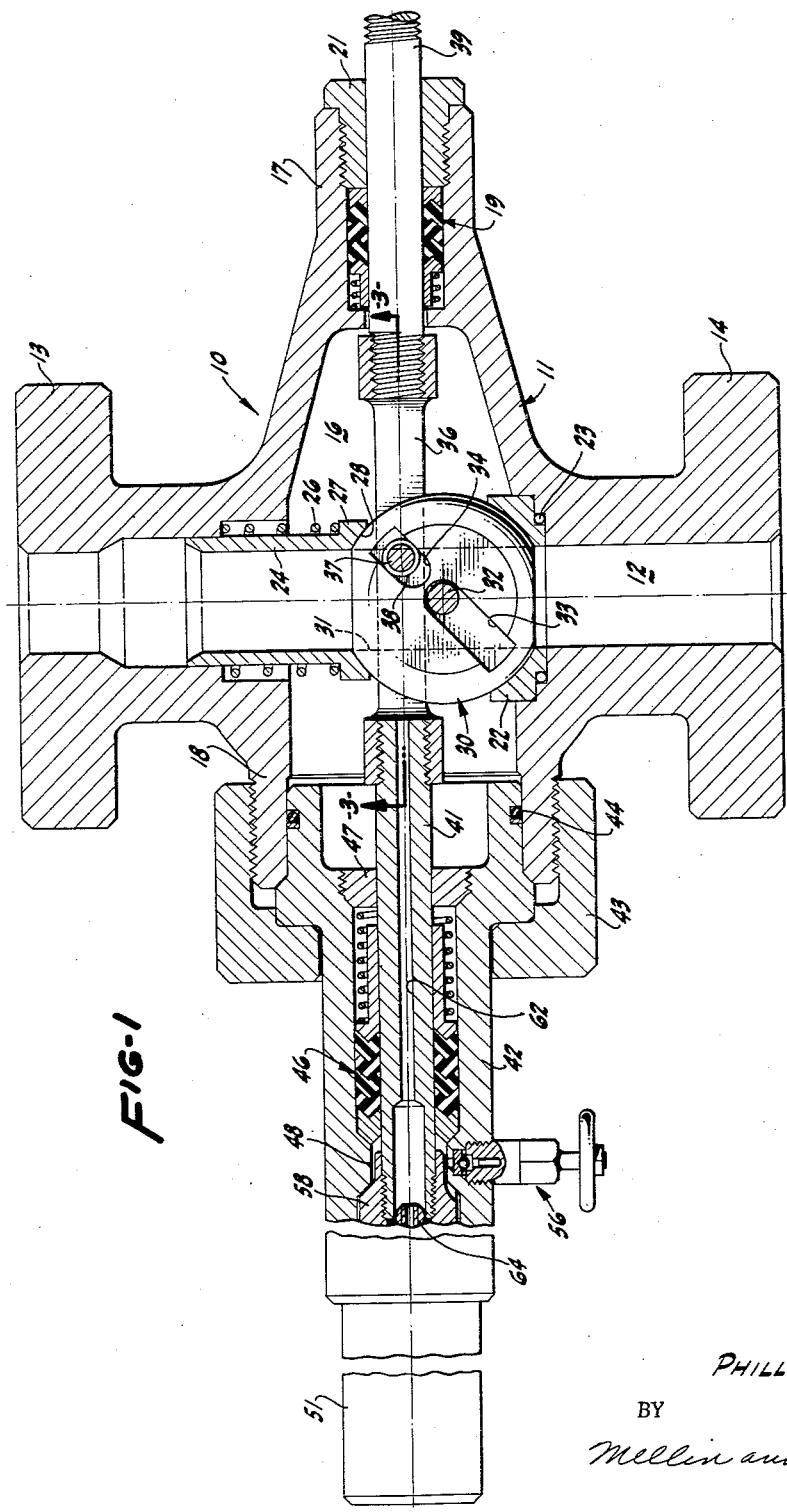

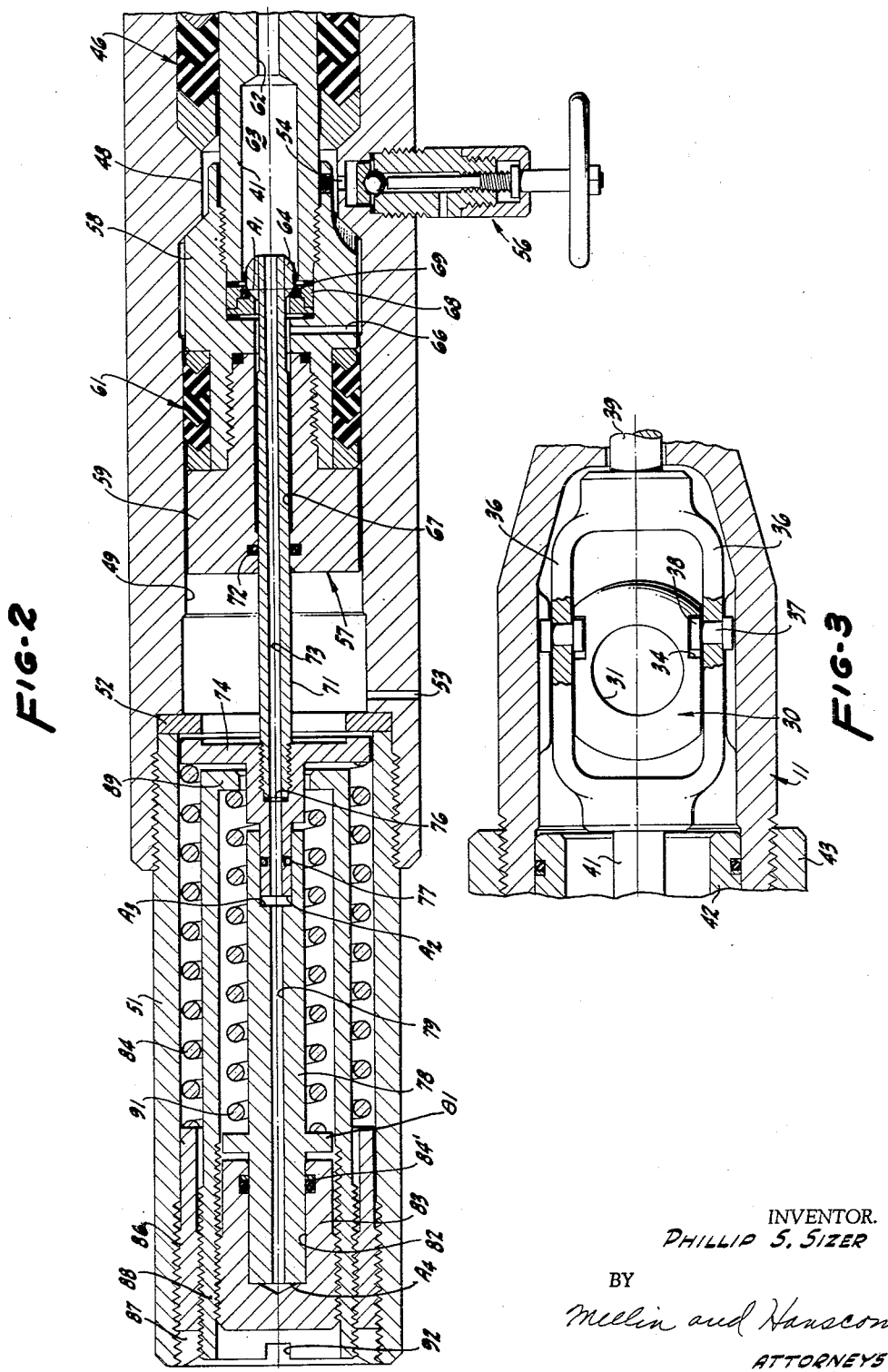

2,993,504
BALL-TYPE SURFACE SAFETY VALVE AND PRESSURE RESPONSIVE PILOT THEREFOR
Phillip S. Sizer, 3606 Seguin Drive, Dallas, Tex.
Filed Sept. 8, 1958, Ser. No. 759,581
12 Claims. (Cl. 137—458)

The present invention relates to valves for use in flowlines or pipelines and has for its principal object the provision of a surface safety valve having a through flow passageway controlled by a ball-valve closure member, which closure is movable to the closed position automatically in response to certain predetermined pressure conditions by means of a pressure responsive member and wherein the energy for closing of the valve is provided by pressure which exists within the passageway of the valve.

Another object is to provide a ball-type surface safety valve adapted to be opened manually and to be closed automatically.

A further object of the invention is to provide a pressure responsive valve operator adapted to close a valve in response to both predetermined high and low pressures within the flowlines controlled by the valve, and in which the high and low pressure values for operation may be easily adjusted.

Another object is to provide a valve for a well head flowline or the like having a straight and smooth bore therethrough, when open, to minimize collection therein of paraffin, sand and the like, and to minimize flow cutting of the valve, turbulence and pressure losses, as well as permitting the free passage of well tools therethrough.

Other objects and advantages will become apparent in the course of the following detailed description.

In the drawings forming a part of this application, and in which like parts are designated by like reference numerals throughout the same, FIG. 1 is a view mostly in section of a ball-type surface safety valve constructed in accordance with the invention.

FIG. 2 is a sectional view on an enlarged scale of the pilot mechanism for the automatic closing of the valve shown in FIG. 1.

FIG. 3 is a sectional detail, taken on line 3—3 of FIG. 1.

Referring now to the drawings, the ball-type surface safety valve 10 comprises a valve body 11 having a main flow passageway 12 therethrough provided with upstream and downstream flanges 13 and 14 for connection into a flowline. The interior of the valve body has a central body cavity 16 through which the passageway 12 passes, and two bonnet connections 17 and 18 are formed on the valve body at right angles to the axis of passageway 12 and at 180° from each other. The lower bonnet 17 carries therein a spring-pressed packing assembly 19 and retainer nut 21.

An annular valve seat 22 is mounted within the body cavity surrounding the outlet portion of the passageway 12 and is sealed off with the body 11 by an O-ring 23.

Guide sleeve 24 is slidably mounted within the inlet portion of the passageway 12 and is biased inwardly by spring 26, which bears against a flange 27 at the inner extremity of sleeve 24. The inner face of the flange is formed with a spherical surface 28 surrounding the bore of the sleeve.

The ball valve member 30 is formed with a bore 31 having a diameter corresponding to that through the sleeve 24 and the inlet and outlet portions of the passageway 12. Ball valve member 30 is retained in place within the body by pins 32, which are each fixedly secured at one end thereof to the valve body 11. The other ends of pins 32 engage grooves 33, which are milled on opposite external surfaces of the ball valve member 30. The centerline of grooves 33 lies in a plane which also includes the axis of rotation of the ball valve member and which plane makes an angle of 45° with the axis of the passageway 12. Thus, the ball valve member is rotatable about an axis transverse to the opening 31 therethrough. A second pair of cam grooves or slots 34 is milled on opposite external surfaces of the ball valve member in such a manner as to have a common centerline with grooves 33.

An operating frame for the ball valve member 30 comprises a yoke 36 disposed within the body cavity astride a portion of the ball valve member 30 and operably connected to said ball valve member by cam lugs 37 affixed to the yoke and extending into grooves 34. Each of the lugs 37 carries a bushing 38 which is rotatable about lugs 37 within slots 34.

The lower end of yoke 36 is threadedly connected to opening stem 39, which extends through the lower bonnet 17 of the valve body. Opening stem 39 is threaded at its lower end to receive an opening handle (not shown) and is sealed off within the lower bonnet by packing assembly 19.

The upper end of yoke 36 is threadedly connected to upper stem 41 which extends upwardly through the upper bonnet into the bore of the cylinder 42.

Cylinder 42 is secured to the upper bonnet of the valve body by bonnet nut 43, and is sealed thereto by O-ring 44.

The cylinder 42 is bored throughout its length, being counterbored at its lower end to receive packing assembly 46, which packs off between upper stem 41 and the lower end of the cylinder. Packing assembly 46 is held in place by gland 47.

A restriction 48 intermediate the ends of the cylinder bore provides a shoulder for seating packing section 46. Above the restriction 48 is an enlarged bore 49 which terminates in an internal thread for engaging the lower end of the pilot housing 51. A shoulder immediately below the threaded connection at the upper end of the cylinder 42 provides a stop for ring 52. The upper portion of the cylinder bore 49 carries a lateral port 53 which communicates with the atmosphere. A second lateral port 54 located adjacent the restricted portion of the cylinder bore is controlled by velocity check valve 56.

The bore of the cylinder 42 between the upper end thereof and restriction 48 forms a piston chamber for piston assembly 57, which comprises a lower element 58, upper element 59 and packing section 61. Lower piston element 58 is threadedly connected to upper stem 41. Upper stem 41 has an axial bore 62 throughout its length, the upper portion of the bore being enlarged to form a valve chamber 63 receiving the pilot valve member 64 therein.

Lower piston element 58 has a passageway 66 formed therein which communicates between the central bore 67 of piston 57 and the exterior of the piston. A pilot valve seat 68, of two-piece construction and carrying an O-ring seal 69, surrounds the passageway through the lower piston element 58 and also the lower end of valve member 64. The pilot valve stem 71, slidably disposed within piston bore 67, is sealed thereto by O-ring 72.

Valve member 64 and pilot valve stem 71 have an axial bore 73 throughout their length, which communicates with the bore 62 of upper stem 41 and is secured at its upper end to flanged member 74 which resides within the bore of the pilot housing 51. The connection between members 71 and 74 is made pressure-tight by a gasket 76.

The upper portion of flanged member 74 has a reduced diameter carrying an O-ring seal 77. A plunger 78 is bored throughout its length at 79 and has at its lower end an enlarged bore which is slidably and sealingly mounted on the reduced upper portion of flanged member 74.

The plunger 78 carries an external flange 81 near its upper end. That portion of the stem above the flange extends into a blind bore, a plunger chamber 82 within plug 83. O-ring 84' seals between the external surface of the plunger 78 and the plunger chamber 83. A spring 84 is carried within the pilot housing 51 and bears at its lower end against the flanged member 74. Spring adjusting bushing 86 is carried within the upper portion of the bore of the pilot housing and engages an internal thread adjacent the upper end of the pilot housing. The lower end of adjusting bushing 86 bears against spring 84 and carries at its upper end a slot 87 which permits rotation of the adjusting bushing to vary the spring load exerted by spring 84 on flanged member 74.

Adjusting bushing 86 is threaded internally to receive spring support 88, a sleeve-type member which extends downwardly about the plunger 78 and carries at its lower end an inner flange 89. Spring 91 is carried within the bore of spring support 88 and bears against flange 89 at the lower end thereof. Spring 91 engages the external flange 81 of plunger 78, biasing said plunger upwardly. The load exerted by spring 91 on plunger 78 may be varied by rotating spring support 88 by means of the slots 92 provided at the upper end of the support.

In operation, the valve 10 is placed within a flowline or pipeline and connected therein by means of the flanged connections at either end of the through flow passageway 12. As shown in the drawing, the valve is in the open position, the bore through the ball valve member 30 being in alignment with the bores of the various other elements that comprise passageway 12. In the open position, the stem 41 and yoke 36 are at the lower extremity of their travel. Fluid pressure existing in the valve body may pass between the unsealed sleeve 24 and ball valve member 30 into the body cavity and upwardly through the bore 62 of stem 41, thence into the bores 73 and 79 through pilot valve stem 71, flanged member 74 and plunger 78, and into the plunger chamber 82 within the plug 83. O-ring 84' prevents the passage of fluid pressure between the external surfaces of plunger 78 and plunger chamber 83.

As shown, pilot valve member 64 is seated against seat 68, thus preventing the passage of fluid around the spherical portion of valve member 64 and into the lateral piston passage 66.

Spring 84 is loaded so that when pressure within the bore of stem 41 below seat 68 decreases to a predetermined point, the spherical pilot valve will be displaced downwardly from the seat 68, allowing the passage of gas into piston passageway 66, thence into velocity check 56. Flow of gas through the velocity check causes the check to close so that pressure within the cavity of the valve body is also exerted below packing section 61, forcing the piston upwardly and carrying with it upper stem 41 and the yoke 36. Upward movement of the stem and yoke assembly causes rotation of the ball valve member 30, moving the passageway through the ball valve member to a position at right angles to the bore through seat 22. The upper spherical surface of ball valve member 30 is then positioned in contact with the spherical surface of seat 22 to seal off the passageway 12.

The pilot mechanism is also responsive to an excessive pressure. Spring 91 is loaded so that when pressure within the bore of stem 41 below seat 68 increases to a predetermined point greater than the predetermined point mentioned in the last paragraph, the spherical pilot valve 64 will be displaced downwardly from the seat, allowing the passage of gas into piston passage 67, thence into velocity check 56. Thereafter, ball valve member 30 is rotated to the closed position by the exact same series of events described in the last paragraph.

In the structure described above, the pilot valve member 64 has an effective area $A_1$ subjected to pressure within the valve chamber 63 to hold the pilot valve against the O-ring seal 69 of pilot valve seat 68, the area $A_1$ being generally the annular area between the bore 73 of the pilot valve and the O-ring 69. The upper end of the pilot valve stem 71 and flanged member 74 has an effective annular area $A_2$ between the bore 73 therethrough and the outer diameter of O-ring 77, which area $A_2$ is acted upon by pressure within bore 73 to unseat the pilot valve member 64 from valve seat 68. Area $A_1$ is greater than area $A_2$. The plunger 78 has an effective area $A_3$ equal to area $A_2$ upon which the pressure in bore 73 exerts a force to hold the plunger in the illustrated upper position. The plunger 78 also has an effective annular area $A_4$ at its upper end, between the bore 79 thereof and the inner diameter of O-ring 84', which is acted upon by the pressure within bore 79 thereof to move the plunger downwardly. Area $A_4$ is larger than areas $A_1$, $A_2$, or $A_3$.

The pilot valve member 64 will be seated on the valve seat 68 whenever the resultant upward force thereon due to pressure (P) within valve chamber 63; i.e., the pressure or the difference between the areas $A_1$ and $A_2$, is greater than the downward force ($F_{84}$) due to the spring 84. Unseating of the pilot valve will then occur whenever the pressure drops to a value such that $P(A_1-A_2)$ is less than $F_{84}$. As is apparent, the value of P required to cause the pilot valve to open is directly proportional to the spring force $F_{84}$; i.e., the higher the spring force, the higher will be the low pressure at which the pilot valve will open.

In high pressure operation of the pilot valve 64, $P(A_1-A_2)$ will be greater than $F_{84}$, and the pressure will hold valve 64 seated. However, the same pressure also acts upon the plunger 78 which is biased upwardly by the upward force $F_{91}$ due to spring 91. If $P(A_4-A_3)$ is greater than $F_{91}$, the plunger will move downwardly against spring 91 with a force equal to $P(A_4-A_3)-F_{91}$ on the valve stem member 71, which is held upwardly by a force equal to $P(A_1-A_2)-F_{84}$. As is evident, if $P(A_4-A_3)-F_{91}$ is greater than $P(A_1-A_2)-F_{84}$, the pilot valve will be unseated. Since $A_2$ and $A_3$ are equal, the high pressure condition for opening of the pilot valve may be expressed that whenever $P(A_4-A_1)$ is greater than $F_{91}-F_{84}$, the pilot valve will be unseated. Again, the high pressure valve for operation is directly dependent upon the adjustment of the force $F_{91}$ of springs 91, assuming the force $F_{84}$ of spring 84 is held constant.

As is further apparent, there can be a wide range of pressures at which the pilot valve will remain seated on valve seat 68, depending upon the limits determined by the setting of springs 84 and 91. Once the pressure in the pilot valve chamber 63 varies either above or below these limits, the pilot valve will be unseated, allowing fluid pressure to pass through the piston passages 67 and 66. This pressure will then cause the piston 57 to move upwardly to close the ball valve member 30, as previously described.

Regardless of the manner in which ball valve member 30 is rotated to the closed position; that is, by either an increase or a decrease within the main passageway 12 and stem 41, the said ball valve member is returned to the open position in the following manner: After the gas pressure has returned to a point within the upper and lower limits established by springs 91 and 84, respectively, velocity check valve 56 is opened to provide an exit for the gas trapped between the piston 57 and the upper packing element 46. An opening handle, not shown, is rotated on opening stem 39 in such manner that the opening stem, yoke 36, stem 41, and the piston assembly 57 are returned to their original positions, whereat pilot valve 64 is seated on seat 68. The surface safety valve 10 is ready to commence another closure cycle as just completed.

It is to be understood that the invention herein illustrated and described is to be taken as a preferred embodiment of the same, and that various changes in the shape, size and arrangement of parts may be resorted to without departing from the spirit of the invention or the scope of the attached claims.

Having thus described my invention, what I claim and desire to secure by Letters Patent is:

1. A ball-type valve comprising a valve body having a flow passageway therethrough with an upstream end, an upstream facing spherical valve seat disposed in said passageway, a ball valve member rotatably mounted in said valve body and having an opening therethrough, said ball valve member being seatable upon said seat for opening and closing said passageway upon rotation about an axis transverse to said opening, an operating frame mounted in said valve body for reciprocal movement therewithin, cam lugs on one operatively engaged with cam slots on the other of said operating frame and opposite sides of said ball valve member for rotating said valve member between opened and closed positions upon reciprocating movement of the operating frame in opposite directions, an extension on said operating frame projecting exteriorly of said valve body for manual movement of said frame in one direction to open said ball valve member, and means operable by and in response to a variance of the presure within said flow passageway from a predetermined range of normal values at which the ball valve member is to remain in open position for moving said operating frame in a direction to close said ball valve member.

2. A ball-type surface safety valve comprising a valve body having a passageway therethrough with an upstream end, an upstream facing spherical valve seat disposed in said passageway, a ball valve member having an opening therethrough and seatable upon said seat for opening and closing said passageway upon rotation about an axis transverse to said opening, an operating frame mounted in said valve body for reciprocal movement therewithin, lug means on one operatively engaged with slot means on the other of said operating frame and said ball valve member for rotating said valve member between opened and closed positions upon reciprocating movement of the control frame in opposite directions, means forming a piston chamber on said valve body, a piston mounted for longitudinal sliding movement in said piston chamber and connected to said operating frame for moving said frame to close said ball valve member, means forming a fluid passage from said piston chamber to said passageway, and means responsive to a decrease of the pressure within said flow passageway below a predetermined minimum value at which the ball valve member is to remain in open position for admitting fluid from said passageway through said passage into said piston chamber so that upon said decrease of pressure within said passageway said piston will be moved by the passageway pressure to move the operating frame to close the ball valve member.

3. A ball-type surface safety valve comprising a valve body having a passageway therethrough with an upstream end, an upstream facing spherical valve seat disposed in said passageway, a ball valve member having an opening therethrough and seatable upon said seat for opening and closing said passageway upon rotation about an axis transverse to said opening, an operating frame mounted in said valve body for reciprocal movement therewithin, lug means on one operatively engaged with slot means on the other of said operating frame and said ball valve member for rotating said valve member between opened and closed positions upon reciprocating movement of the control frame in opposite directions, means forming a piston chamber on said valve body, a piston mounted for longitudinal sliding movement in said piston chamber and connected to said operating frame for moving said frame to close said ball valve member, means forming a fluid passage from said piston chamber to said passageway, and means responsive to an increase of the pressure within said flow passageway above a predetermined maximum value at which the ball valve member is to remain in open position for admitting fluid from said passageway through said passage into said piston chamber so that upon said increase of pressure within said passageway said piston will be moved by the passageway pressure to move the operating frame to close the ball valve member.

4. A ball-type surface safety valve comprising a valve body having a passageway therethrough with an upstream end, an upstream facing spherical valve seat disposed in said passageway, a ball valve member having an opening therethrough and seatable upon said seat for opening and closing said passageway upon rotation about an axis transverse to said opening, an operating frame mounted in said valve body for reciprocal movement therewithin, lug means on one operatively engaged with slot means on the other of said operating frame and said ball valve member for rotating said valve member between opened and closed positions upon reciprocating movement of the control frame in opposite directions, means forming a piston chamber on said valve body, a piston mounted for longitudinal sliding movement in said piston chamber and connected to said operating frame for moving said frame to close said ball valve member, means forming a fluid passage from said piston chamber to said passageway, means responsive to a decrease of the pressure within said flow passageway below a predetermined minimum value at which the ball valve member is to remain in open position for admitting fluid from said passageway through said passage into said piston chamber, and means responsive to an increase of the pressure within said flow passageway above a predetermined maximum value at which the ball valve member is to remain in open position for admitting fluid from said passageway through said passage into said piston chamber.

5. A ball-type surface safety valve comprising a valve body having a passageway therethrough with an upstream end, an upstream facing spherical valve seat disposed in said passageway, a ball valve member having an opening therethrough and seatable upon said seat for opening and closing said passageway upon rotation about an axis transverse to said opening, an operating frame mounted in said valve body for reciprocal movement therewithin, lug means on one operatively engaged with slot means on the other of said operating frame and said ball valve member for rotating said valve member between opened and closed positions upon reciprocating movement of the control frame in opposite directions, means forming a piston chamber on said valve body in alignment with the path of movement of said operating frame, a piston mounted for longitudinal sliding movement in said piston chamber and connected to said operating frame for moving said frame to close said ball valve member, means forming a fluid passage from said piston chamber to said passageway, means responsive to a decrease of the pressure within said flow passageway below a predetermined minimum value at which the ball valve member is to remain in open position for admitting fluid from said passageway through said passage into said piston chamber, and means responsive to an increase of the pressure within said flow passageway above a predetermined maximum value at which the ball valve member is to remain in open position for admitting fluid from said passageway through said passage into said piston chamber so that upon said decrease or increase of pressure within said passageway said piston will be moved by the passageway pressure to move the operating frame to close the ball valve member.

6. A ball-type surface safety valve comprising a valve body having a flow passageway therethrough with an upstream end, an upstream facing spherical valve seat disposed in said passageway, a ball valve member having an opening therethrough and seatable upon said seat for opening and closing said passageway upon rotation about an axis transverse to said opening, an operating frame mounted in said valve body for reciprocal movement therewithin, cam lugs on one operatively engaged with cam slots on the other of said operating frame and opposite sides of said ball valve member for rotating said valve member between opened and closed positions upon reciprocating movement of the control frame in opposite directions, an extension on said operating frame projecting exteriorly of said valve body for manual movement of said frame in a direction to open said ball valve member, means forming a piston chamber on said valve body in alignment with the path of movement of said operating frame, a piston mounted for longitudinal sliding movement in said piston chamber and connected to said operating frame for moving said frame to close said ball valve member, means forming a fluid passage from said piston chamber to said passageway, means responsive to a decrease of the pressure within said flow passageway below a predetermined minimum value at which the ball valve member is to remain in open position for admitting fluid from said passageway through said passage into said piston chamber, and means responsive to an increase of the pressure within said flow passageway above a predetermined maximum value at which the ball valve member is to remain in open position for admitting fluid from said passageway through said passage into said piston chamber so that upon said decrease or increase of pressure within said passageway said piston will be moved by the passageway pressure to move the operating frame to close the ball valve member.

7. A ball-type surface safety valve comprising a valve body having a passageway therethrough with an upstream end, an upstream facing spherical valve seat disposed in said passageway, a ball valve member having an opening therethrough and seatable upon said seat for opening and closing said passageway upon rotation about an axis transverse to said opening, an operating frame mounted in said valve body for reciprocal movement therewithin, lug means on one operatively engaged with slot means on the other of said operating frame and said ball valve member for rotating said valve member between opened and closed positions upon reciprocating movement of the control frame in opposite directions, means forming a piston chamber on said valve body, a piston mounted for longitudinal sliding movement in said piston chamber and connected to said operating frame for moving same, means forming a passage extending from said passageway to said piston chamber, a pilot valve seat in said passage facing upstream therein towards said passageway, a pilot valve seatable upon said pilot valve seat, a stem member connected to said pilot valve for unseating said pilot valve from said pilot valve seat, a first spring resiliently urging said stem member in a direction to unseat said pilot valve, means forming a plunger chamber in alignment with said stem members, a plunger mounted for longitudinal sliding movement in said plunger chamber and engageable with said stem member, a second spring resiliently urging said plunger out of engagement with said stem member, and passage means fluidly connecting said plunger chamber to said passage upstream of said valve seat therein, said plunger having a larger effective area than said pilot valve.

8. A ball-type surface safety valve comprising a valve body having a flow passageway therethrough with an upstream end, an upstream facing spherical valve seat disposed in said passageway, a ball valve member having an opening therethrough and seatable upon said seat for opening and closing said passageway upon rotation about an axis transverse to said opening, an operating frame mounted in said valve body for reciprocal movement therewithin, cam lugs on one operatively engaged with cam slots on the other of said operating frame and opposite sides of said ball valve member for rotating said valve member between opened and closed positions upon reciprocating movement of the control frame in opposite directions, an extension on said operating frame projecting exteriorly of said valve body for manual movement of said frame in a direction to open said ball valve member, means forming a piston chamber on said valve body, a piston mounted for longitudinal sliding movement in said piston chamber and connected to said operating frame for moving same, means forming a passage extending from said passageway to said piston chamber, a pilot valve seat in said passage facing upstream therein towards said passageway, a pilot valve seatable upon said pilot valve seat, a stem member connected to said pilot valve for unseating said pilot valve from said pilot valve seat, a first spring resiliently urging said stem member in a direction to unseat said pilot valve, means forming a plunger chamber in alignment with the path of movement of said stem member, a plunger mounted for longitudinal sliding movement in said plunger chamber and engageable with said stem member, a second spring resiliently urging said plunger out of engagement with said stem member, and passage means fluidly connecting said plunger chamber to said passage upstream of said valve seat therein, said plunger having a larger effective area than said pilot valve.

9. A ball-type surface safety valve comprising a valve body having a flow passageway therethrough with an upstream end, an upstream facing spherical valve seat disposed in said passageway, a ball valve member having an opening therethrough and seatable upon said seat for opening and closing said passageway upon rotation about an axis transverse to said opening, an operating frame mounted in said valve body for reciprocal movement therewithin, cam lugs on one operatively engaged with cam slots on the other of said operating frame and opposite sides of said ball valve member for rotating said valve member between opened and closed positions upon reciprocating movement of the control frame in opposite directions, an extension on said operating frame projecting exteriorly of said valve body for manual movement of said frame in a direction to open said ball valve member, means forming a piston chamber on said valve body in alignment with the path of movement of said operating frame, a piston mounted for longitudinal sliding movement in said piston chamber and connected to said operating frame for moving same, means forming a passage extending from said passageway to said piston chamber, a pilot valve seat in said passage facing upstream therein towards said passageways, a pilot valve seatable upon said pilot valve seat, a stem member connected to said pilot valve for unseating said pilot valve from said pilot valve seat, a first spring resiliently urging said stem member in a direction to unseat said pilot valve, means forming a plunger chamber in alignment with the path of movement of said stem member, a plunger mounted for longitudinal sliding movement in said plunger chamber and engageable with said stem member, a second spring resiliently urging said plunger out of engagement with said stem member, passage means fluidly connecting said plunger chamber to said passage upstream of said valve seat therein, said plunger having a larger effective area than said pilot valve, means to vent said piston chamber to atmosphere, and means to separately adjust the spring forces of said first and second springs.

10. A ball-type surface safety valve comprising a valve body having a passageway therethrough with an upstream end, an upstream facing spherical valve seat disposed in said passageway, a ball valve member having an opening therethrough and seatable upon said seat for opening and closing said passageway upon rotation about an axis transverse to said opening, an operating frame mounted in said valve body for reciprocal movement therewithin, lug means on one operatively engaged with slot means on the other of said operating frame and said ball valve member for rotating said valve member between opened and closed positions upon reciprocating movement of the control frame in opposite directions, means forming a piston chamber on said valve body, a piston slidably mounted in said piston chamber and connected to said operating frame for movement therewith, a pilot valve chamber formed within said piston, an inlet passage means communicating said pilot valve chamber with said passageway, a pilot valve seat in said pilot valve chamber, an outlet passage means from said pilot valve chamber through said pilot valve seat to said piston chamber, a pilot valve member in said pilot valve chamber removably seated upon said pilot valve seat, a stem member connected to said pilot valve and projecting axially from said piston, means forming a plunger chamber in alignment with said stem member, a plunger member mounted for sliding movement in said plunger chamber and projecting outwardly therefrom, said plunger and stem member being sealingly telescoped together and having cooperating shoulder surfaces so that movement of said plunger outwardly from said plunger chamber will move said stem member to unseat said pilot valve from said pilot valve seat, said stem member, pilot valve and plunger having passages longitudinally therethrough to fluidly communicate said plunger chamber and said pilot valve chamber, said plunger having an effective area subjected to fluid pressure to be moved outwardly from said plunger chamber which is greater than the effective area of said pilot valve subjected to fluid pressure in said pilot valve chamber to hold said pilot valve against said pilot seat, a first spring resiliently urging said pilot valve stem in a direction to move said pilot valve away from said pilot valve seat, and a second spring resiliently urging said plunger into said plunger chamber.

11. A ball-type surface safety valve comprising a valve body having a flow passageway therethrough with an upstream end, an upstream facing spherical valve seat disposed in said passageway, a ball valve member having an opening therethrough and seatable upon said seat for opening and closing said passageway upon rotation about an axis transverse to said opening, an operating frame mounted in said valve body for reciprocal movement therewithin, cam lugs on one operatively engaged with cam slots on the other of said operating frame and opposite sides of said ball valve member for rotating said valve member between opened and closed positions upon reciprocating movement of the control frame in opposite directions, an extension on said operating frame projecting exteriorly of said valve body for manual movement of said frame in a direction to open said ball valve member, means forming a piston chamber on said valve body, a piston slidably mounted in said piston chamber and connected to said operating frame for movement therewith, a pilot valve chamber formed within said piston, an inlet passage means communicating said pilot valve chamber with said passageway, a pilot valve seat in said pilot valve chamber, an outlet passage means from said pilot valve chamber through said pilot valve seat to said piston chamber, a pilot valve member in said pilot valve chamber removably seated upon said pilot valve seat, a stem member connected to said pilot valve and projecting axially from said piston, means forming a plunger chamber in alignment with said stem member, a plunger member mounted for sliding movement in said plunger chamber and projecting outwardly therefrom, said plunger and stem member being sealingly telescoped together and having cooperating shoulder surfaces so that movement of said plunger outwardly from said plunger chamber will move said stem member to unseat said pilot valve from said pilot valve seat, said stem member, pilot valve and plunger having passages longitudinally therethrough to fluidly communicate said plunger chamber and said pilot valve chamber, said plunger having an effective area subjected to fluid pressure to be moved outwardly from said plunger chamber which is greater than the effective area of said pilot valve subjected to fluid pressure in said pilot valve chamber to hold said pilot valve against said pilot seat, a first spring resiliently urging said pilot valve stem in a direction to move said pilot valve away from said pilot valve seat, and a second spring resiliently urging said plunger into said plunger chamber.

12. A ball-type surface safety valve comprising a valve body having a flow passageway therethrough with an upstream end, an upstream facing spherical valve seat disposed in said passageway, a ball valve member having an opening therethrough and seatable upon said seat for opening and closing said passageway upon rotation about an axis transverse to said opening, an operating frame mounted in said valve body for reciprocal movement therewithin, cam lugs on one operatively engaged with cam slots on the other of said operating frame and opposite sides of said ball valve member for rotating said valve member between opened and closed positions upon reciprocating movement of the control frame in opposite directions, an extension on said operating frame projecting exteriorly of said valve body for manual movement of said frame in a direction to open said ball valve member, means forming a piston chamber on said valve body in alignment with the path of movement of said operating frame, a piston mounted for longitudinal sliding movement in said piston chamber and connected to said operating frame for moving same to close said ball valve member, a pilot valve chamber formed within said piston, an inlet passage means communicating said pilot valve chamber with said passageway, a pilot valve seat in said pilot valve chamber, an outlet passage means from said pilot valve chamber through said pilot valve seat to said piston chamber, a pilot valve member in said pilot valve chamber seatable upon said pilot valve seat, a stem member connected to said pilot valve and projecting axially from said piston, means forming a plunger chamber having an opening in alignment with said stem member, a plunger member mounted for sliding movement in said plunger chamber and projecting outwardly through said opening, said plunger and stem member being sealingly telescoped together and having cooperating shoulder surfaces so that movement of said plunger outwardly from said plunger chamber will move said stem member to unseat said pilot valve from said pilot valve seat, said stem member, pilot valve and plunger having passages longitudinally therethrough to fluidly communicate said plunger chamber and said pilot valve chamber, said plunger having an effective area subjected to fluid pressure to be moved outwardly from said plunger chamber, which is greater than the effective area of said pilot valve subjected to fluid pressure in said pilot valve chamber to hold said pilot valve against said pilot seat, a first spring resiliently urging said pilot valve stem in a direction to move said pilot valve away from said pilot valve seat, a second spring resiliently urging said plunger into said plunger chamber, means to separately adjust the spring forces of said first and second springs, and valve means to vent the piston chamber to atmosphere.

References Cited in the file of this patent

UNITED STATES PATENTS

| | | |
|---|---|---|
| 1,341,319 | Hodges | May 25, 1920 |
| 2,264,677 | Oxland | Dec. 2, 1941 |
| 2,584,847 | Dahl | Feb. 5, 1952 |
| 2,695,037 | McCuistion | Nov. 23, 1954 |
| 2,733,729 | Wolfe | Feb. 7, 1956 |
| 2,762,396 | Fawick | Sept. 11, 1956 |
| 2,834,371 | Liljestrand | May 13, 1958 |
| 2,894,715 | Bostock | July 14, 1959 |